(12) United States Patent
Gregg et al.

(10) Patent No.: US 7,958,313 B2
(45) Date of Patent: Jun. 7, 2011

(54) TARGET COMPUTER PROCESSOR UNIT (CPU) DETERMINATION DURING CACHE INJECTION USING INPUT/OUTPUT (I/O) ADAPTER RESOURCES

(75) Inventors: Thomas A. Gregg, Highland, NY (US); Rajaram B. Krishnamurthy, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 11/958,431

(22) Filed: Dec. 18, 2007

(65) Prior Publication Data
US 2009/0157978 A1 Jun. 18, 2009

(51) Int. Cl.
*G06F 12/00* (2006.01)
(52) U.S. Cl. .......... 711/137; 711/E12.057; 711/E12.033
(58) Field of Classification Search .................. 711/137, 711/E12.023, E12.033, E12.034, E12.057
See application file for complete search history.

(56) References Cited

U.S. PATENT DOCUMENTS

| | | | |
|---|---|---|---|
| 6,243,788 B1 * | 6/2001 | Franke et al. ................ | 711/3 |
| 6,269,390 B1 * | 7/2001 | Boland ......................... | 718/100 |
| 6,711,651 B1 * | 3/2004 | Moreno et al. ................ | 711/141 |
| 7,159,077 B2 | 1/2007 | Tu et al. | |
| 2004/0128450 A1 | 7/2004 | Edirisooriya et al. | |
| 2005/0246500 A1 * | 11/2005 | Iyer et al. ...................... | 711/137 |
| 2006/0064518 A1 | 3/2006 | Bohrer et al. | |
| 2006/0085602 A1 | 4/2006 | Huggahalli et al. | |
| 2006/0112238 A1 * | 5/2006 | Jamil et al. .................. | 711/145 |
| 2006/0136671 A1 * | 6/2006 | Balakrishnan et al. ........ | 711/122 |
| 2007/0156968 A1 * | 7/2007 | Madukkarumukumana et al. .............................. | 711/138 |
| 2008/0065832 A1 * | 3/2008 | Srivastava et al. ............ | 711/130 |
| 2008/0104325 A1 * | 5/2008 | Narad et al. .................. | 711/122 |
| 2008/0127131 A1 * | 5/2008 | Gao et al. ...................... | 717/140 |
| 2008/0229009 A1 * | 9/2008 | Gaither et al. ................ | 711/113 |

OTHER PUBLICATIONS

Khunjush et al., Lazy Direct-to-Cache Transfer during Receive Operations in a Message Passing Environment, ACM CF'06, May 3-5, 2006, pp. 331-340.
U.S. Appl. No. 11/958,418, filed Dec. 18, 2007.
U.S. Appl. No. 11/958,424, filed Dec. 18, 2007.
U.S. Appl. No. 11/958,435, filed Dec. 18, 2007.
U.S. Appl. No. 11/958,440, filed Dec. 18, 2007.
U.S. Appl. No. 11/958,445, filed Dec. 18, 2007.

* cited by examiner

*Primary Examiner* — Shane M Thomas
(74) *Attorney, Agent, or Firm* — Cantor Colburn LLP; Steven Chiu

(57) ABSTRACT

A method, system, and computer program product for target computer processor unit (CPU) determination during cache injection using input/output (I/O) adapter resources are provided. The method includes storing locations of cache lines for pinned or affinity scheduled processes in a table on an input/output (I/O) adapter. The method also includes setting a cache injection hint in an input/output (I/O) transaction when an address in the I/O transaction is found in the table. The cache injection hint is set for performing direct cache injection. The method further includes entering a central processing unit (CPU) identifier and cache type in the I/O transaction, and updating a cache by injecting data values of the I/O transaction into the cache as determined by the CPU identifier and the cache type associated with the address in the table.

18 Claims, 7 Drawing Sheets

TARGET COMPUTER PROCESSOR UNIT (CPU) DETERMINATION DURING CACHE INJECTION USING INPUT/OUTPUT (I/O) ADAPTER RESOURCES

BACKGROUND OF THE INVENTION

The present disclosure relates generally to data processing and, in particular, to a method, system, and computer program product for target computer processor unit (CPU) determination during cache injection using adapter resources.

Recently, direct cache access (also referred to as cache injection) schemes have been developed. In addition, 'receive message' processing schemes have been developed to "pin" a receive message handler on a computer processing unit (CPU) so that cache locality is preserved. In a symmetrical multiprocessor (SMP) machine, cache injection transaction from an input/output (I/O) device requires a snoopy broadcast on the bus. Processor caches can snoop values and update caches; however, this is an expensive transaction considering that cache injection must execute concurrently with other operations like inter-processor communication and prefetching. In a non-uniform memory access (NUMA) machine, cache injection transactions require values to be broadcast to every processor in the NUMA domain, which consumes expensive interconnect bandwidth.

What is needed, therefore, is a way to inject I/O write values directly into a specific processor cache without requiring a broadcast to every processor cache in the hierarchy to reduce cache pollution and conserve processor complex interconnect bandwidth.

BRIEF SUMMARY OF THE INVENTION

Embodiments of the invention include a method for target computer processor unit (CPU) determination during cache injection using input/output (I/O) adapter resources. The method includes storing locations of cache lines for pinned or affinity scheduled processes in a table on an input/output (I/O) adapter. The method also includes setting a cache injection hint in an input/output (I/O) transaction when an address in the I/O transaction is found in the table. The cache injection hint is set for performing direct cache injection. The method further includes entering a central processing unit (CPU) identifier and cache type in the I/O transaction, and updating a cache by injecting data values of the I/O transaction into the cache as determined by the CPU identifier and the cache type associated with the address in the table.

Additional embodiments include a system for target computer processor unit (CPU) determination during cache injection using input/output (I/O) adapter resources. The system includes an input/output (I/O) adapter and a processor complex in communication with the I/O adapter. The processor complex includes a hierarchically organized cache system. The I/O adapter includes logic executing thereon for performing a method. The method includes storing locations of cache lines for pinned or affinity scheduled processes in a table on the I/O adapter. The method also includes setting a cache injection hint in an input/output (I/O) transaction when an address in the I/O transaction is found in the table. The cache injection hint is set for performing direct cache injection. The method further includes entering a central processing unit (CPU) identifier and cache type in the I/O transaction, and updating a cache by injecting data values of the I/O transaction into the cache as determined by the CPU identifier and the cache type associated with the address in the table.

Additional embodiments of the invention include a computer program product for target computer processor unit (CPU) determination during cache injection using input/output (I/O) adapter resources. The computer program product includes a storage medium readable by a processing circuit and storing instructions for execution by the processing circuit for implementing a method. The method includes storing locations of cache lines for pinned or affinity scheduled processes in a table on an input/output (I/O) adapter. The method also includes setting a cache injection hint in an input/output (I/O) transaction when an address in the I/O transaction is found in the table. The cache injection hint is set for performing direct cache injection. The method further includes entering a central processing unit (CPU) identifier and cache type in the I/O transaction, and updating a cache by injecting data values of the I/O transaction into the cache as determined by the CPU identifier and the cache type associated with the address in the table.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments of the invention relate to processes for implementing target computer processor unit (CPU) determination during cache injection using adapter resources (also referred to herein as "cache injection management"). The cache injection management processes provide the ability to inject I/O write values directly into a specific processor cache without requiring a broadcast to every processor cache, as described further in FIGS. 1-5. Cache injection refers to a process by which data values, e.g., in a direct memory access (DMA) write transaction, are directly injected into a hierarchically organized cache system in a broadcast-type manner; that is, incoming traffic, e.g., from a network, is broadcast to each of the caches in the hierarchy, as opposed to the system memory or a subset of the caches. By performing cache injection, subsequent access to the data is quicker, thereby reducing latency associated with accessing the system memory. The cache with the broadcasted address then updates its value. It will be understood that cache injection encompasses both cache line updates (the cache line already exists in the cache) and also cache line allocates (a new entry is made). The information is broadcast to each of the caches because the computer system's system chipset or I/O hub typically does not have knowledge of which cache has an I/O write address stored therein. This operation is performed for all addresses and associated data, since the I/O hub has no information regarding the cached addresses in the processor complex. Clearly, this process leads to considerable bandwidth waste, as 'inject'-able values are broadcast even for addresses not cached in any of the processor complex caches. The data transfer to memory processes described herein provide a means for inject I/O write values directly into a specific processor cache (e.g., a target processor's cache) without requiring a broadcast to every processor cache in the hierarchy.

Figure 1:
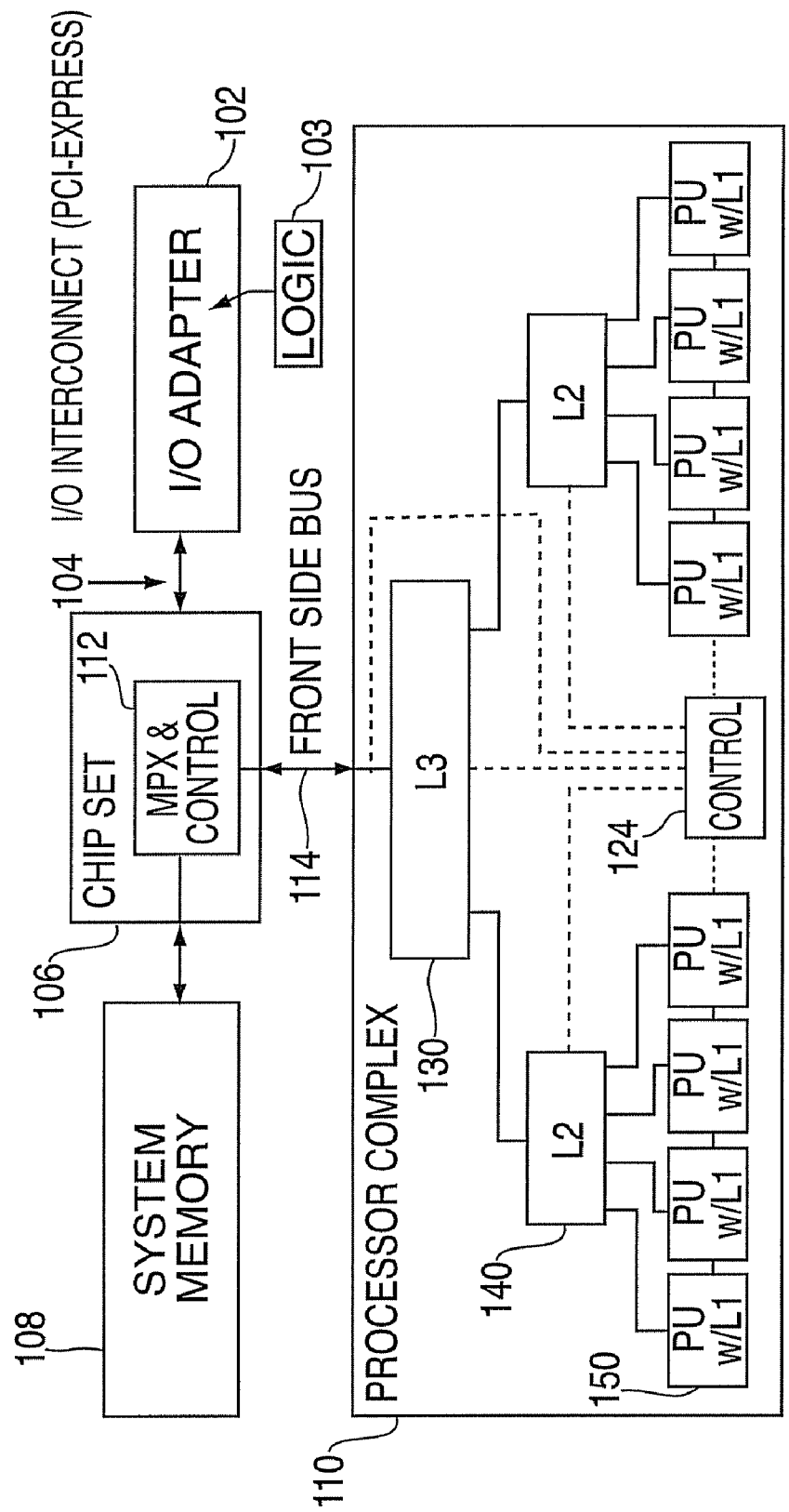
FIG. 1 is a symmetrical multiprocessor architecture (SMP) for use in implementing adapter-side methods for target central processing unit (CPU) determination during cache injection in accordance with an exemplary embodiment.

Turning now to FIG. 1, an exemplary system for implementing the cache injection management processes will now be described. The system of FIG. 1 relates to an SMP architecture in which a system memory 108 is coupled with a system chipset 106 or I/O hub (e.g., a system employing Intel® processors). The system includes an I/O adapter 102 (which, in turn, includes a processor and logic) coupled to the chipset 106 via a bi-directional I/O interconnect 104 (e.g., PCI Express). The chipset 106 is communicatively coupled to the system memory 108 (also referred to herein as main memory). The chipset 106 is also coupled to a processor complex 110 over a front side bus (FSB) 114. The I/O adapter 102 reads/writes data between the chipset 106 and peripheral devices (not shown).

The processor complex 110 includes multiple processing units, each with a level 1 (L1) cache 150. In the embodiment shown in FIG. 1, the processor complex 110 also includes a level 2 (L2) cache 140 and level 3 (L3) cache 130. The levels 130, 140, and 150 of cache represent a storage hierarchy of the processor complex 110. L3 represents a highest cache level (highest memory latency), and L1 represents a lowest cache level (lowest memory latency) in the hierarchy. It will be understood that any number of cache levels may be implemented in order to realize the advantages of the invention. Three levels L1-L3 are provided for illustrative purposes only and are not to be construed as limiting in scope. In addition, as shown in FIG. 1 for illustrative purposes, multiple processing units (PUs) or groups of processing units may share a common Level 2 and Level 3 storage space in the cache hierarchy.

The processor complex 110 also includes a control unit 124 which manages the traffic (e.g., data transfers) associated with transactions occurring within the complex 110 with respect to the cache hierarchy L1-L3.

The chipset 106 may include a group of integrated circuits (chips) that work together to perform various tasks. In an exemplary embodiment, the chipset 106 includes a multiplexer (MPX) and controller 112 for directing the traffic associated with transactions occurring among the I/O adapter 102, the system memory 108, and the processor complex 110 (e.g., read and write transactions). While the embodiment described in FIG. 1 is directed to a chipset 106, it will be understood that other devices may be utilized in implementing the data transfer to memory processes (e.g., cards, boards, etc.).

As described above, conventional systems perform cache injection by broadcasting data values of a transaction to each of the caches in a hierarchically organized cache system. This is reflected in FIG. 1 by the solid lines directly interconnecting MPX 112 to L3, L3 to L2, and L2 to L1. The data transfer to memory processes described in these exemplary embodiments utilize logic 103 executing in the I/O adapter 102 (e.g., software/firmware) to perform adapter-side target CPU determination during cache injection to inject data values for a transaction directly into an identified target processor's cache, as shown e.g., by the dotted lines in the processor complex 110 of FIG. 1.

Tuning now to FIG. 2, a system upon which the cache injection management processes may be implemented in accordance with another exemplary embodiment will now be described. The system of FIG. 2 relates to an SMP architecture in which a system memory 208 is coupled with a processor complex 210 (e.g., a system employing AMD® processors or IBM® system z™ or p™ processors). Various components of the system of FIG. 2 overlap in function with components described above in FIG. 1. To this extent, these components and/or functions will not be described in detail. The system of FIG. 2 includes an I/O adapter 202 in communication with an I/O hub 220 over an I/O interconnect 204 (e.g., PCIe). The I/O hub 220 is communicatively coupled to the processor complex 210 via an I/O bus 214. The processor complex 210, likewise, is communicatively coupled to the system memory 208 (also referred to as main memory). The processor complex 210 includes a cache hierarchy with three levels of cache, namely L1 250, L2 240, and L3 230. The I/O hub 220 communicates with the processor complex 210 via control unit 224 which directs traffic between the I/O hub 220, the cache hierarchy, and the system memory 208 via a multiplexer 222.

The I/O adapter 202 reads/writes data to the processor complex 210 and the system memory 208 via the I/O interconnect 204, I/O hub 220, I/O bus 214 and MPX 222. For example, in a conventional cache injection process, the data transaction or request is generated in the I/O adapter 102 and distributed over the I/O interconnect 204 to the I/O hub 220 using, e.g., PCI Express protocols. The I/O hub 220 performs a translation (e.g., transforming the PCI Express protocols to those in which the I/O bus 214 will understand) and distributes the translated data over the I/O bus 214 to the control unit 224 where it is sent directly to the L3 cache 230. The cache injection management processes of the exemplary embodiments utilize logic 203 executing in on the I/O adapter 202 (e.g., software/firmware) to perform adapter-side target CPU determination during cache injection, such that the data values in an I/O transaction may be directed injected into a target processor's cache, as opposed to a general broadcast to all of the cache locations in the processor complex 210. This is shown in FIG. 2 by the dotted lines from the control unit 224 representing wires used to activate and target a specific cache.

Figure 3:
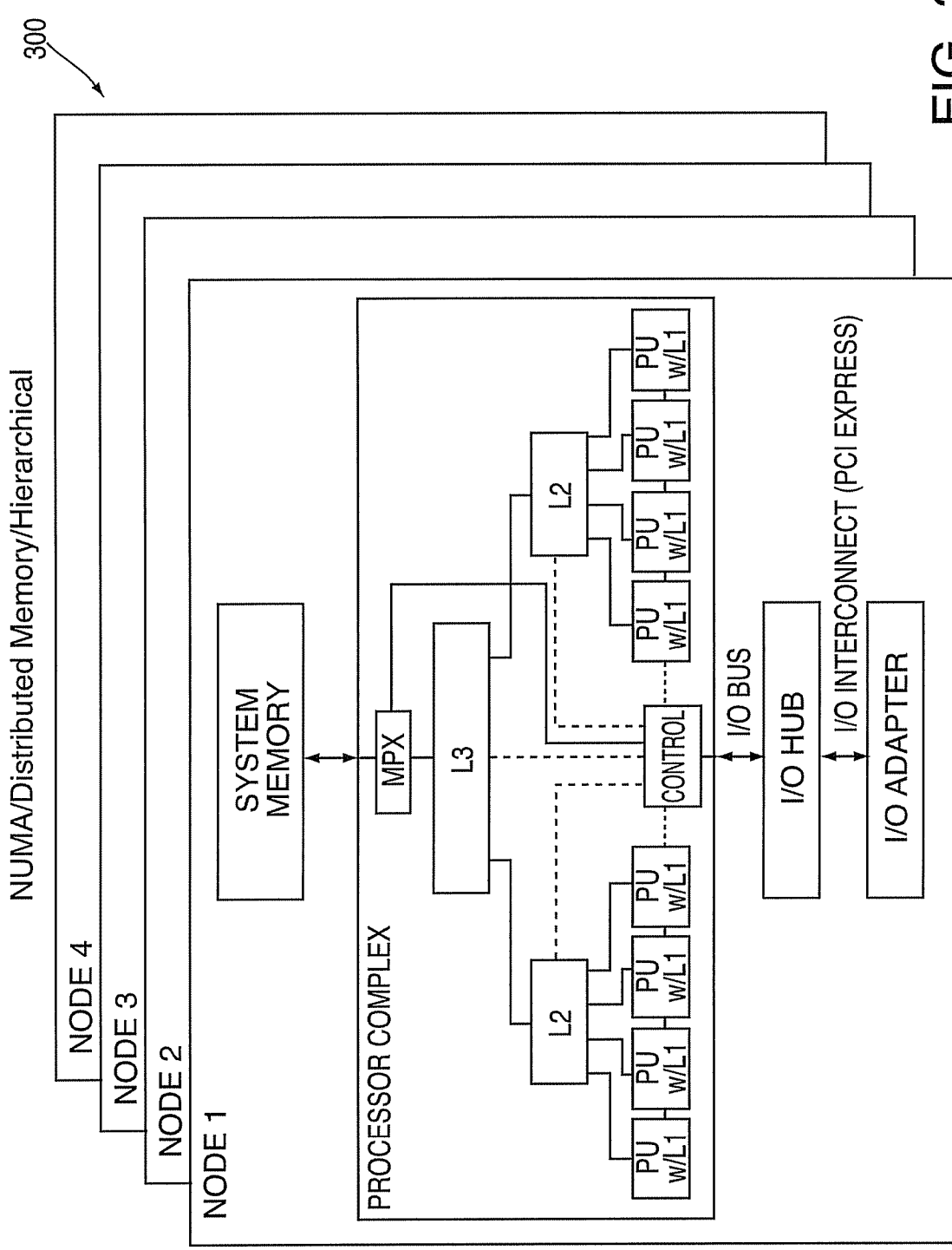
FIG. 3 is a non-uniform memory access (NUMA) architecture with distributed memory for use in implementing adapter-side methods for target central processing unit (CPU) determination during cache injection in accordance with yet another exemplary embodiment.

Turning now to FIG. 3, a non-uniform memory access (NUMA) architecture with distributed memory for use in implementing direct cache injection management will now be described. The system of FIG. 3 includes multiple nodes 300 (Nodes 1-4), which communicate among one another for performing data transactions including the adapter-side methods for target CPU determination during cache injection data transfer to memory processes described herein. Each of the Nodes 1-4 may include a multiplexer (MPX) (e.g., MPX 222) that steers data to system memory or cache hierarchy in the processor complex. The processor complex for each of Nodes 1-4 are interconnected and communicate with one another to form the NUMA, or distributed, memory model-based machine. Keeping data values coherent in the caches may be implemented, e.g., using scalable directory-based cache coherency techniques or snoopy bus protocols. It will be understood that the direct cache injection management processes may be implemented over a system that includes multiple nodes in an SMP architecture as shown, e.g., in FIG. 1 as well. For example, multiple nodes may be interconnected via chipsets of each of the nodes.

In an exemplary embodiment, the cache injection management processes enable the I/O adapter 202 to determine a particular CPU's cache for injecting data values based upon preset identifiers stored in the I/O adapter 202. That is, the I/O transaction is embedded with a CPU identifier, cache type, and injection bit. In the I/O interconnect 204, e.g., PCI Express, a transaction layer thereof generates header and data for the transaction. The transaction layer header carries this information for memory write PCI transactions. When the transaction (which includes the embedded elements) reaches the system chipset 106 of FIG. 1, the chipset 106 directs the address and corresponding data extracted from the transaction to the target processor identified by the adapter 102 as described further herein.

Figure 2:
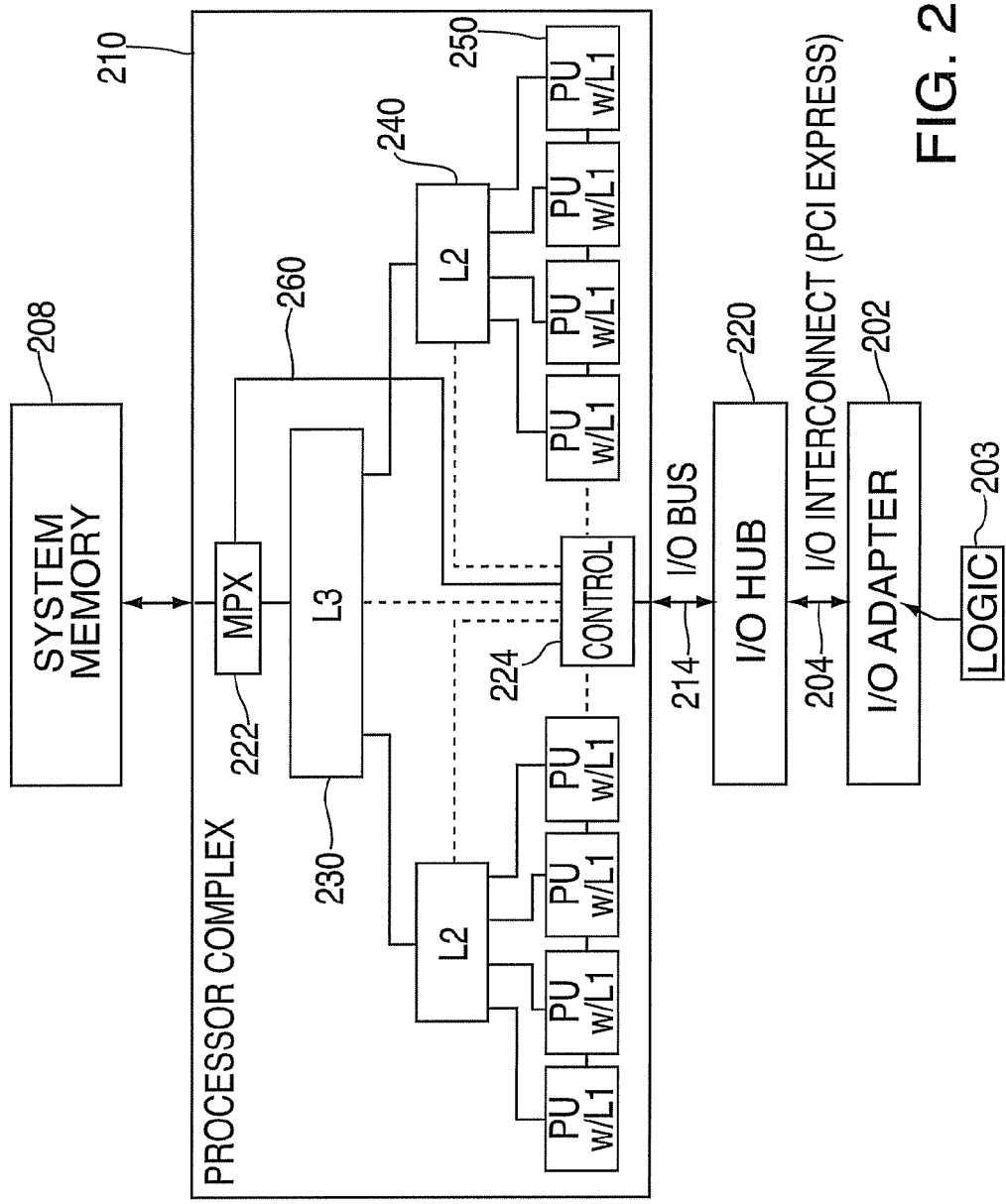
FIG. 2 is a symmetrical multiprocessor architecture (SMP) for use in implementing adapter-side methods for target central processing unit (CPU) determination during cache injection in accordance with another exemplary embodiment.

Alternatively, as shown in FIG. 2, when the transaction (which includes the embedded elements) reaches the controller 224 of FIG. 2, the I/O hub 224 directs the address and corresponding data extracted from the transaction to the target processor identified by the adapter 202 as described further herein.

Figure 4:
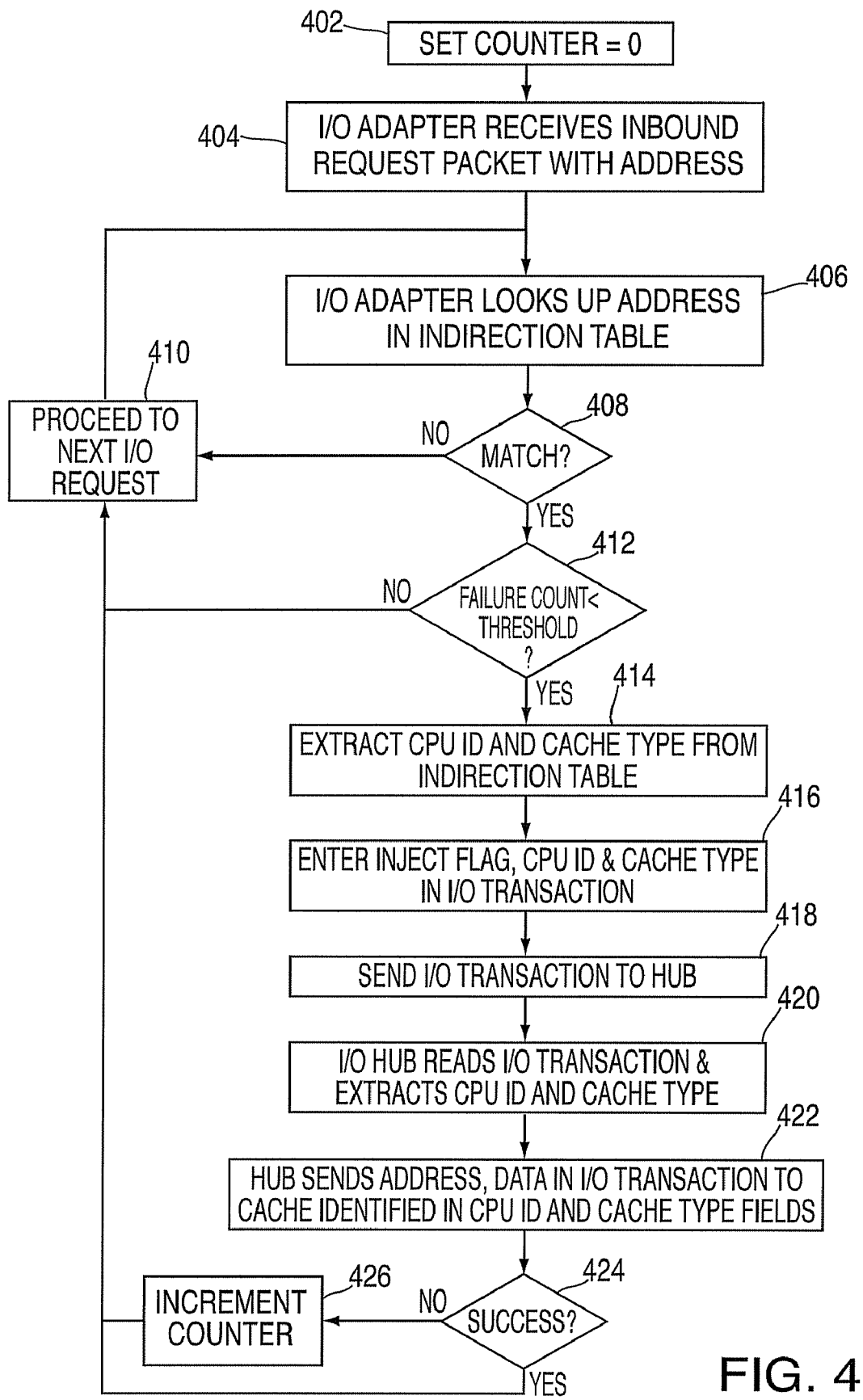
FIG. 4 is a flow diagram describing a process for implementing adapter-side methods for target central processing unit (CPU) determination during cache injection in accordance with an exemplary embodiment.
Figure 5:
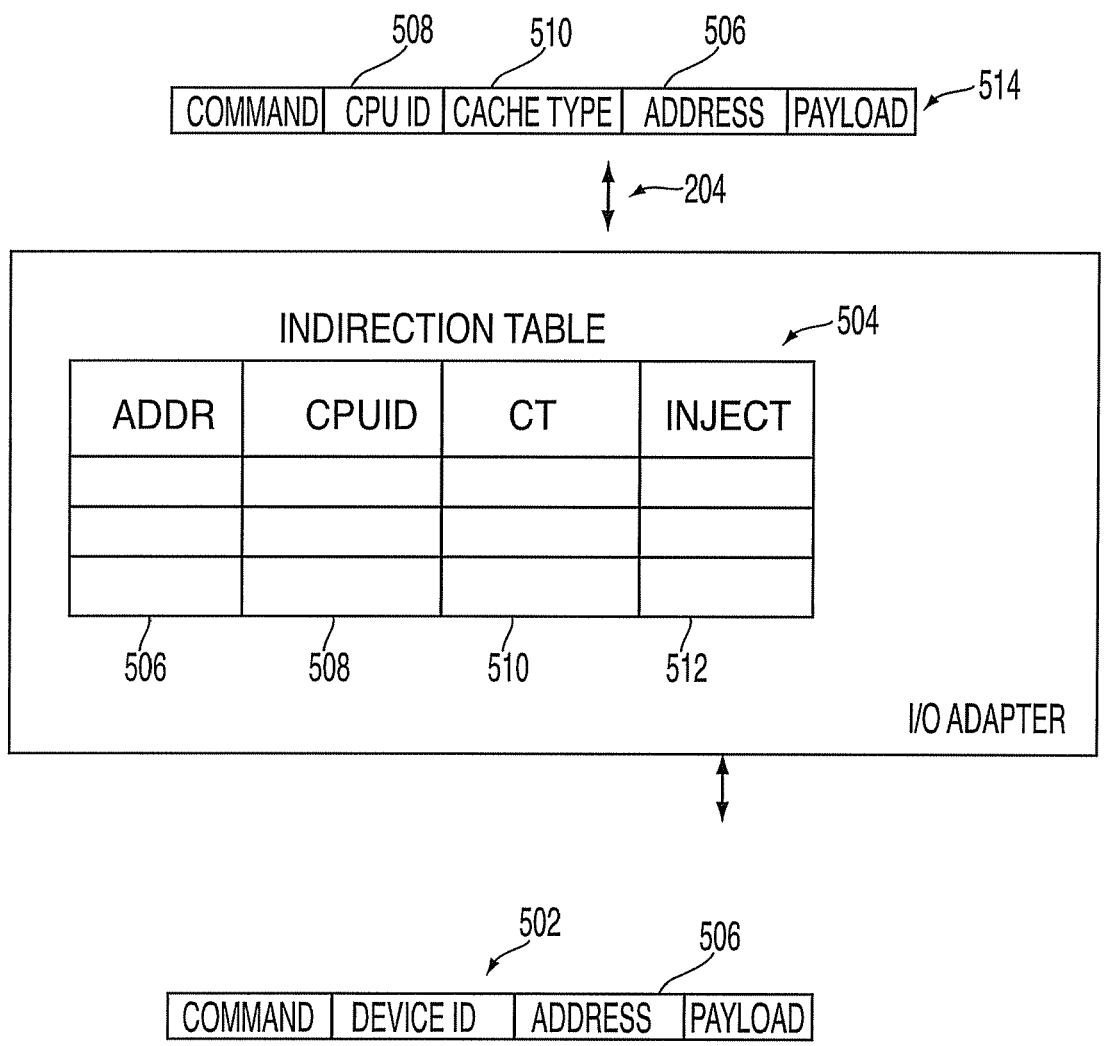
FIG. 5 is a block diagram describing components of an input/output (I/O) adapter used in the system of FIG. 2 in accordance with an exemplary embodiment.

Turning now to FIGS. 4 and 5, an I/O adapter and process for implementing the cache injection management processes will now be described in exemplary embodiments. For purposes of illustration, the process described in FIG. 4 relates to the adapter 202 of FIG. 2.

As indicated above, the direct cache injection management processes enable I/O adapter-side methods for target CPU determination during cache injection. The adapter-side methods provide a means to inject I/O write values directly into a specific processor cache without requiring a broadcast to every processor cache as will now be described.

The processes described FIG. 4 assume that an indirection table 504 (FIG. 5) has been populated with designated CPU identifiers and cache types for each processor in the processor complex 210. The indirection table 504 may be set by a processor in the processor complex 210. In particular, locations of cache lines for pinned or affinity scheduled processes are stored in the indirection table 504, which resides on the I/O adapter 202. A "pinned" process is usually bound, locked or "tied" to a CPU or set of CPUs. It cannot be run on CPUs outside the group. Cache affinity scheduling algorithms of the operating system strive to maintain the working set of the process bound to the CPU chosen. I/O write addresses that exhibit reader-writer sharing patterns between a processor and I/O and belonging to affinity scheduled processes have a high likelihood of being present in a specific cache. Keeping I/O addresses of affinity scheduled processes is prudent on the adapter as their locations are likely to change less rapidly due to OS (Operating System) re-scheduling. This is an important consideration as the I/O adapter is distant from the processor complex and incurs longer latency for updates from the processor complex to be visible. The locations of the cache lines are recorded in the table 504 and correspond to a cache footprint of processes that are cache affinity scheduled. The table 504 stores addresses or address ranges 506, CPU identifiers 508, and cache types 510 for the processor complex 210. The cache type may be one of varying levels of hierarchical storage in the processor complex 110/210 (e.g., one of cache levels L1, L2, L3). The indirection table 504 may also include a field 512 for setting an injection bit, which designates an address for injection into a cache store.

The I/O adapter 202 may also store a counter, or failure counter (not shown). The counter tracks the number of failed attempts to update a cache in the processor complex 210 for a given address. At each failed attempt, the counter is incremented until a preset threshold has been reached, as will be described further herein. The process of FIG. 4 begins where the counter is set to zero.

At step 404, the I/O adapter 202 receives an inbound request packet 502, which includes an address 506. At step 406, the I/O adapter 202 looks up the address 506 in the indirection table 504. If the address is not present in the table 504 at step 408, the I/O adapter proceeds to the next request at step 410, and the process returns to step 406. Otherwise, if the address is present in the table 504, the I/O adapter 202 checks the counter to see if the failure count is less than the preset threshold value at step 412. If not, this means that the failure count has been exceeded for this address. In this instance, the I/O adapter 202 proceeds to the next I/O request at step 410.

Otherwise, if the threshold has not been reached or exceeded at step 412, the I/O adapter extracts the CPU ID 508 and cache type 510 from the table 504 at step 414. The I/O adapter 202 adds CPU ID 508, cache type 510, and inject/no inject hint bit 516 in an I/O transaction 514. At step 418, the I/O transaction 514 is sent to the I/O hub 220, which reads the I/O transaction 514 and extracts the CPU ID 508 and cache type 510 at step 420. At step 422, the I/O hub 220 sends the address 506 and data (e.g., "PAYLOAD") in the I/O transaction to the cache identified by the CPU ID 508 and cache type 510 fields in the table 504.

A processor in the processor complex 210, I/O hub 220 or chipset 206 includes logic for sending failure notifications to the I/O adapter 202 when a cache update or cache line allocate with respect to the I/O transaction has not been successfully completed. At step 424, the processor determines whether the cache update is successful. If so, the I/O adapter 202 proceeds to the next I/O request at step 410. If, on the other hand, the cache update is not successful, the I/O adapter 202 increments the counter by one at step 426 and proceeds to the next I/O request at step 410. In another embodiment of the present invention, if the failure counter exceeds the threshold, the CPU ID 508 and CT 510 fields are nullified, meaning that any future accesses to this address will result in a broadcast in the processor complex 210 without specific targeting of any CPU. This is because the CPU ID 508 and CT 510 field values are deleted from the entry, but the address entry in table 504 still exists. If the cache injection broadcast is unsuccessful, then the entry in table 504 corresponding to the unsuccessful address is retired. If the cache injection broadcast is successful, the new cache location of the address reported in response to the broadcast can be used to update CPU ID 508 and CT 510 fields in table 504. In yet another embodiment of the present invention, if the failure counter exceeds the threshold for a certain address, then the addresses from the I/O adapter 202 are injected using a write-update scheme before a failure threshold (update failure_threshold) is reached. After update_failure_threshold is exceeded, injection proceeds using a write-allocate scheme until allocate_failure_threshold is reached, after which, the address range entry in field 506 is marked for replacement in table 504.

In yet another embodiment of the present invention, a CPU in the processor complex 210, the I/O hub 220 or chipset 206 can proactively retire an entry from table 504 if successive cache injection transactions are unsuccessful. Such techniques are useful as they allow processor complex interconnect bandwidth to be used in a prudent way.

Figure 6:
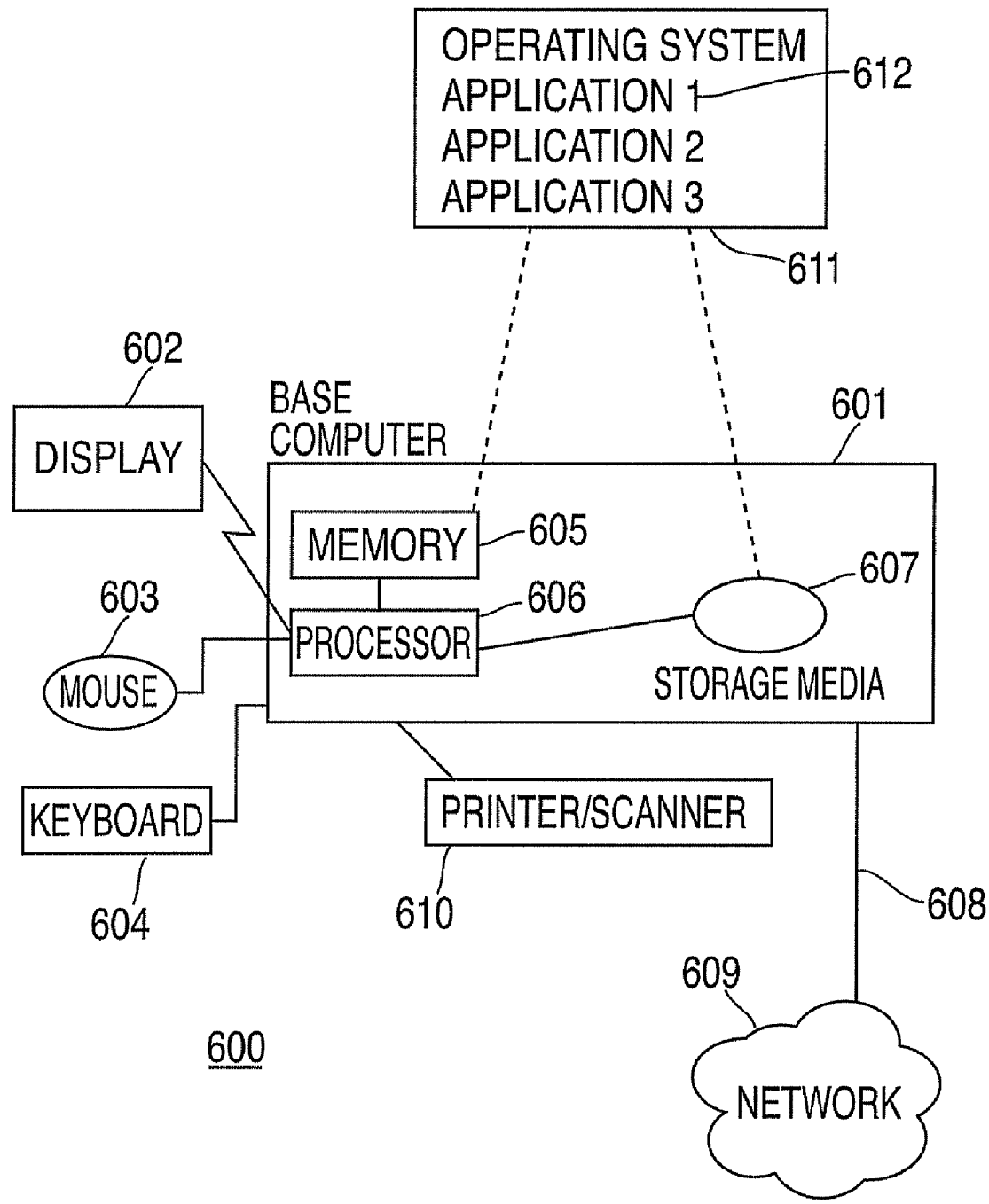
FIG. 6 is a workstation for implementing adapter-side methods for target central processing unit (CPU) determination during cache injection in accordance with an exemplary embodiment.

FIG. 6 illustrates a representative workstation or server hardware system in which the present invention may be practiced. The system 600 of FIG. 6 comprises a representative computer system 601, such as a personal computer, a workstation or a server, including optional peripheral devices. The workstation 601 includes one or more processors 606 and a bus employed to connect and enable communication between the processor(s) 606 and the other components of the system 601 in accordance with known techniques. The bus connects the processor 606 to memory 605 and long-term storage 607 which can include a hard drive, diskette drive or tape drive for example. The system 601 might also include a user interface adapter, which connects the microprocessor 606 via the bus to one or more interface devices, such as a keyboard 604, mouse 603, a printer/scanner 610 and/or other interface devices, which can be any user interface device, such as a touch sensitive screen, digitized entry pad, etc. The bus also connects a display device 602, such as an LCD screen or monitor, to the microprocessor 606 via a display adapter.

The system 601 may communicate with other computers or networks of computers by way of a network adapter capable of communicating 608 with a network 609. Example network adapters are communications channels, token ring, Ethernet or modems. Alternatively, the workstation 601 may communicate using a wireless interface, such as a CDPD (cellular digital packet data) card. The workstation 601 may be associated with such other computers in a Local Area Network (LAN) or a Wide Area Network (WAN), or the workstation 601 can be a client in a client/server arrangement with another computer, etc. All of these configurations, as well as the appropriate communications hardware and software, are known in the art.

Figure 7:
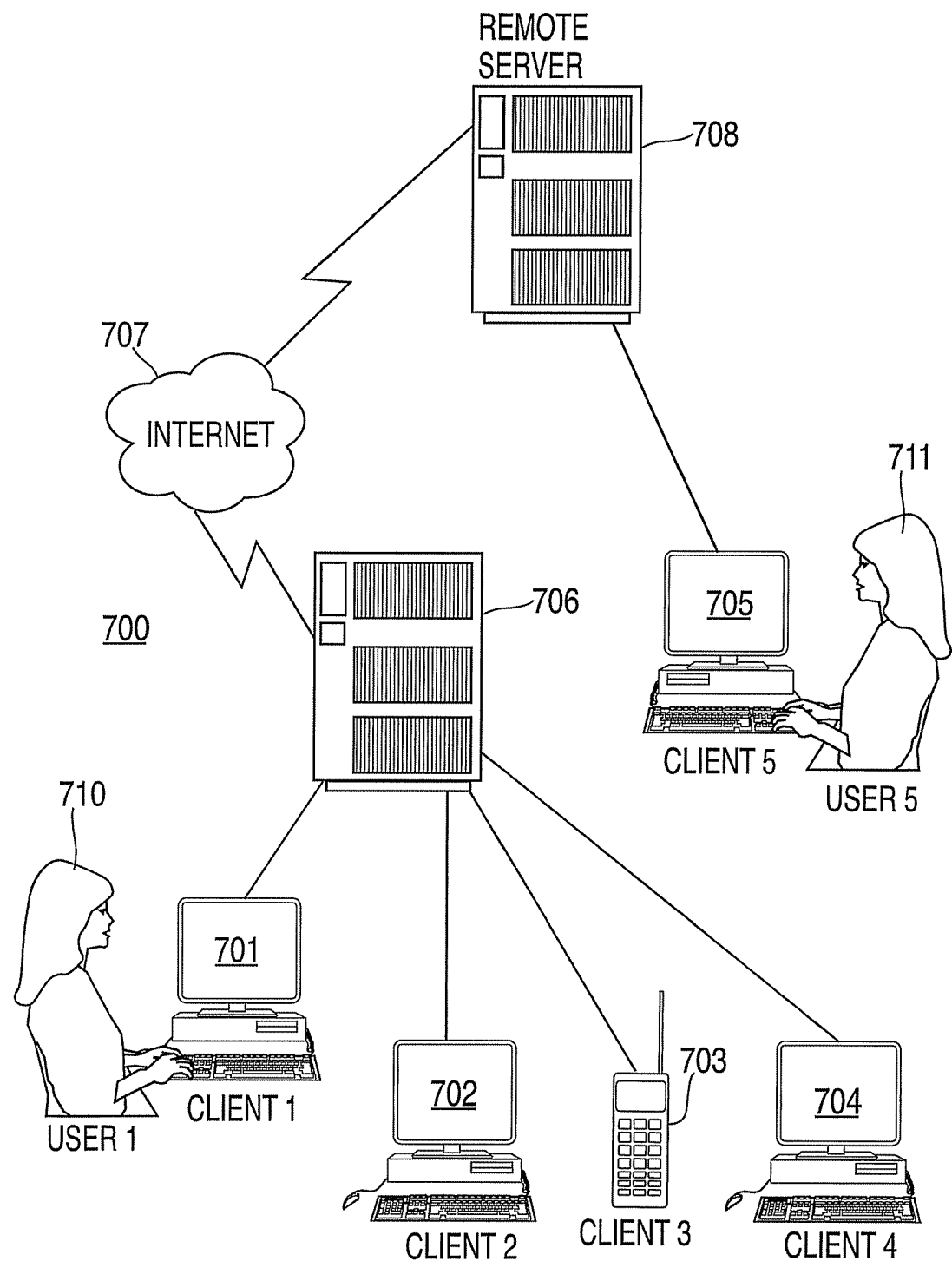
FIG. 7 is a data processing network for implementing adapter-side methods for target central processing unit (CPU) determination during cache injection in accordance with an exemplary embodiment.

FIG. 7 illustrates a data processing network 700 in which the present invention may be practiced. The data processing network 700 may include a plurality of individual networks, such as a wireless network and a wired network, each of which may include a plurality of individual workstations 601, 701, 702, 703, and 704. Additionally, as those skilled in the art will appreciate, one or more LANs may be included, where a LAN may comprise a plurality of intelligent workstations coupled to a host processor.

Still referring to FIG. 7, the network may also include mainframe computers or servers, such as a gateway computer (client server 706) or application server (remote server 708 which may access a data repository and may also be accessed directly from a workstation 705). The gateway computer 706 serves as a point of entry into each network 707. A gateway is needed when connecting one networking protocol to another. The gateway 706 may be preferably coupled to another network (the Internet 707 for example) by means of a communications link. The gateway 706 may also be directly coupled to one or more workstations 601, 701, 702, 703, and 704 using a communications link. The gateway computer may be implemented utilizing an IBM eServer zSeries® 600 Server available from IBM Corp.

Software programming code which embodies the present invention is typically accessed by the processor 606 of the system 601 from long-term storage media 607, such as a CD-ROM drive or hard drive. The software programming code may be embodied on any of a variety of known media for use with a data processing system, such as a diskette, hard drive, or CD-ROM. The code may be distributed on such media, or may be distributed to users 710, 711 from the memory or storage of one computer system over a network to other computer systems for use by users of such other systems.

Alternatively, the programming code 611 may be embodied in the memory 605, and accessed by the processor 606 using the processor bus. Such programming code includes an operating system which controls the function and interaction of the various computer components and one or more application programs 612. Program code is normally paged from dense storage media 607 to high-speed memory 605 where it is available for processing by the processor 606. The techniques and methods for embodying software programming code in memory, on physical media, and/or distributing software code via networks are well known and will not be further discussed herein.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for target computer processor unit (CPU) determination during cache injection using input/output (I/O) adapter resources, comprising:
   storing locations of cache lines for cache affinity scheduled processes in a table on an input/output (I/O) adapter;
   setting a cache injection hint in an input/output (I/O) transaction when an address in the I/O transaction is found in the table, the cache injection hint operable for performing direct cache injection;
   entering a central processing unit (CPU) identifier and cache type in the I/O transaction;
   updating a cache by injecting data values of the I/O transaction into the cache as determined by the CPU identifier and the cache type associated with the address in the table; and
   incrementing a counter in response to receiving a failure notice, wherein setting the cache injection hint is implemented when cache updates for the address have not returned a number of failure notices that equal or exceed a threshold value.

2. The method of claim 1, wherein storing locations of cache lines in a table includes recording entries corresponding to a cache footprint of processes that are pinned to a CPU or group of CPUs and cannot be run on other CPUs outside the group.

3. The method of claim 1, further comprising:
   returning the failure notice to the I/O adapter when the data values are not successfully entered into the cache as determined by the CPU identifier.

4. The method of claim 3, further comprising:
   proactively retiring an entry from the table when successive direct cache injection transactions are unsuccessful.

5. The method of claim 1, wherein the counter is stored on the I/O adapter, the method further comprising:
   nullifying a CPU identifier field and a cache type field of the I/O transaction when the counter exceeds the threshold value;
   wherein nullifying the CPU identifier and cache type fields causes future accesses to the address in the I/O transaction to result in a broadcast in a processor complex without specific targeting of any CPU.

6. The method of claim 5, further comprising:
   retiring an entry in the table when the broadcast is unsuccessful, the entry corresponding to the unsuccessful address.

7. The method of claim 1, further comprising:
   injecting addresses from the I/O adapter using a write-update scheme before a failure threshold is reached when the counter exceeds the threshold for a designated address; and
   injecting addresses from the I/O adapter using a write-allocate scheme before a failure threshold is reached when the counter exceeds the threshold for a designated address marking a corresponding address range entry in the table for replacement.

8. The method of claim 1, further comprising:
   updating a CPU identifier field and a cache type field of the I/O transaction using a cache location of an address reported in response to a broadcast, when the direct cache injection is successful.

9. A system for target computer processor unit (CPU) determination during cache injection using input/output (I/0) adapter resources, comprising:
   an I/O adapter; and
   a processor complex including a hierarchically organized cache system, the processor complex in communication with the I/O adapter;
   wherein the I/O adapter executes logic for performing:
   receiving and storing locations of cache lines for cache affinity scheduled processes in a table on the I/O adapter;
   setting a cache injection hint in an input/output (I/O) transaction when an address in the I/O transaction is found in the table, the cache injection hint operable for performing direct cache injection;
   entering a central processing unit (CPU) identifier and cache type in the I/O transaction; and
   updating a cache by injecting data values of the I/O transaction into the cache as determined by the CPU identifier and the cache type associated with the address in the table; and
   incrementing a counter in response to a failure notice, wherein setting the cache injection hint is implemented when cache updates for the address have not returned a number of failure notices that equal or exceed a threshold value.

10. The system of claim 9, wherein storing locations of cache lines in a table includes recording entries corresponding to a cache footprint of processes that are pinned to a CPU or group of CPUs and cannot be run on other CPUs outside the group.

11. The system of claim 9, wherein the CPU executes logic for performing:
    returning the failure notice to the I/O adapter when the data values are not successfully entered into the cache as determined by the CPU identifier.

12. The system of claim 9, wherein the counter is stored on the I/O adapter, the logic executing on the I/O adapter further performs:
    nullifying a CPU identifier field and a cache type field of the I/O transaction when the counter exceeds the threshold value;
    wherein nullifying the CPU identifier and cache type fields causes future accesses to the address in the I/O transaction to result in a broadcast in a processor complex without specific targeting of any CPU.

13. The system of claim 12, wherein the logic executing on the I/O adapter further performs:
    retiring an entry in the table when the broadcast is unsuccessful, the entry corresponding to the unsuccessful address.

14. The system of claim 9, wherein the logic executing on the I/O adapter further performs:
    proactively retiring an entry from the table when successive direct cache injection transactions are unsuccessful.

15. A computer program product for target computer processor unit (CPU) determination during cache injection using input/output (I/O) adapter resources, the computer program product comprising:
    a storage medium readable by a processing circuit and storing instructions for execution by the processing circuit for implementing a method, the method comprising:
    storing locations of cache lines for cache affinity scheduled processes in a table on an input/output (I/O) adapter;
    setting a cache injection hint in an input/output (I/O) transaction when an address in the I/O transaction is found in the table, the cache injection hint operable for performing direct cache injection;
    entering a central processing unit (CPU) identifier and cache type in the I/O transaction; and updating a cache by injecting data values of the I/O transaction into the cache as determined by the CPU identifier and the cache type associated with the address in the table; and incrementing a counter in response to a failure notice, wherein setting the cache injection hint is implemented when cache updates for the address have not returned a number of failure notices that equal or exceed a threshold value.

16. The computer program product of claim 15, wherein storing locations of cache lines in a table includes recording entries corresponding to a cache footprint of processes that are pinned to a CPU or group of CPUs and cannot be run on other CPUs outside the group.

17. The computer program product of claim 15, further comprising instructions for implementing:

returning the failure notice to the I/O adapter when the data values are not successfully entered into the cache as determined by the CPU identifier.

18. The computer program product of claim 17, wherein the counter is stored on the I/O adapter, the method further comprising:

nullifying a CPU identifier field and a cache type field of the I/O transaction when the counter exceeds the threshold value;

wherein nullifying the CPU identifier and cache type fields causes future accesses to the address in the I/O transaction to result in a broadcast in a processor complex without specific targeting of any CPU.

* * * * *